United States Patent
Dvorkis et al.

[19]

[11] Patent Number: 5,874,720
[45] Date of Patent: Feb. 23, 1999

[54] ELECTRO-MAGNETICALLY ACTIVATED SCANNER WITH SUSPENDED SCANNER COMPONENT

[75] Inventors: Paul Dvorkis, Stony Brook; Howard Shepard, Great Neck; Simon Bard; Joseph Katz, both of Stony Brook; Edward Barkan, Setauket, all of N.Y.

[73] Assignee: Symbol Technologies, Inc., Holtsville, N.Y.

[21] Appl. No.: 915,551

[22] Filed: Aug. 13, 1997

Related U.S. Application Data

[63] Continuation of Ser. No. 885,513, Jun. 30, 1997, Pat. No. 5,825,013, which is a continuation of Ser. No. 589,761, Jan. 22, 1996, abandoned, which is a division of Ser. No. 467,124, Jun. 6, 1995, Pat. No. 5,581,070, which is a continuation of Ser. No. 108,521, Jul. 19, 1993, abandoned, which is a division of Ser. No. 868,401, Apr. 14, 1992, Pat. No. 5,280,165, which is a division of Ser. No. 520,464, May 8, 1990, Pat. No. 5,168,149, which is a continuation-in-part of Ser. No. 428,770, Oct. 30, 1989, Pat. No. 5,099,110.

[51] Int. Cl.⁶ ........................................... G06K 7/10
[52] U.S. Cl. ............................. 235/467; 235/462
[58] Field of Search ........................ 235/462, 472, 235/467; 359/213, 214, 198, 199

[56] References Cited

U.S. PATENT DOCUMENTS

| | | | |
|---|---|---|---|
| 3,532,408 | 10/1970 | Dostal | 350/6 |
| 3,642,344 | 2/1972 | Corker | 350/6 |
| 4,230,393 | 10/1980 | Burke, Jr. | 350/6.5 |
| 4,578,571 | 3/1986 | Williams | 235/472 |
| 4,902,083 | 2/1990 | Wells | 350/6.6 |
| 5,245,463 | 9/1993 | Goto | 359/214 |

FOREIGN PATENT DOCUMENTS

| | | |
|---|---|---|
| 0 344 882 A2 | 12/1989 | European Pat. Off. . |
| 60-107017 | 6/1985 | Japan . |
| 63-34508 | 2/1988 | Japan . |
| 4-368907 | 12/1992 | Japan . |
| 6-12513 | 1/1994 | Japan . |
| 2 097 148 | 10/1982 | United Kingdom . |
| 2 175 705 | 12/1986 | United Kingdom . |
| WO 90/01715 | 2/1990 | WIPO . |

OTHER PUBLICATIONS

Laser Beam Scanning Opto–Mechanical Devices, Systems, and Data Storage Optics, Gerald F. Marshall, *Galvanometric and Resonant Low Interia Scanners*, Jean Montagu, pp. 193–288. no date.

*Primary Examiner*—Anita Pellman Gross
*Assistant Examiner*—Karl Frech
*Attorney, Agent, or Firm*—Kirschstein, et al.

[57] ABSTRACT

High speed scanning arrangements in scanners for reading bar code symbols by oscillating a scanner component in a single line pattern, the scanner assembly being suspended from a flexural assembly for oscillating movement. A drive is operative for moving the scanner assembly from a rest position in a circumferential direction to one of two scan end positions. The flexural assembly is tensioned and stores energy, which energy is released in order to return the scanner assembly in the other circumferential direction to the other scan end position.

33 Claims, 2 Drawing Sheets

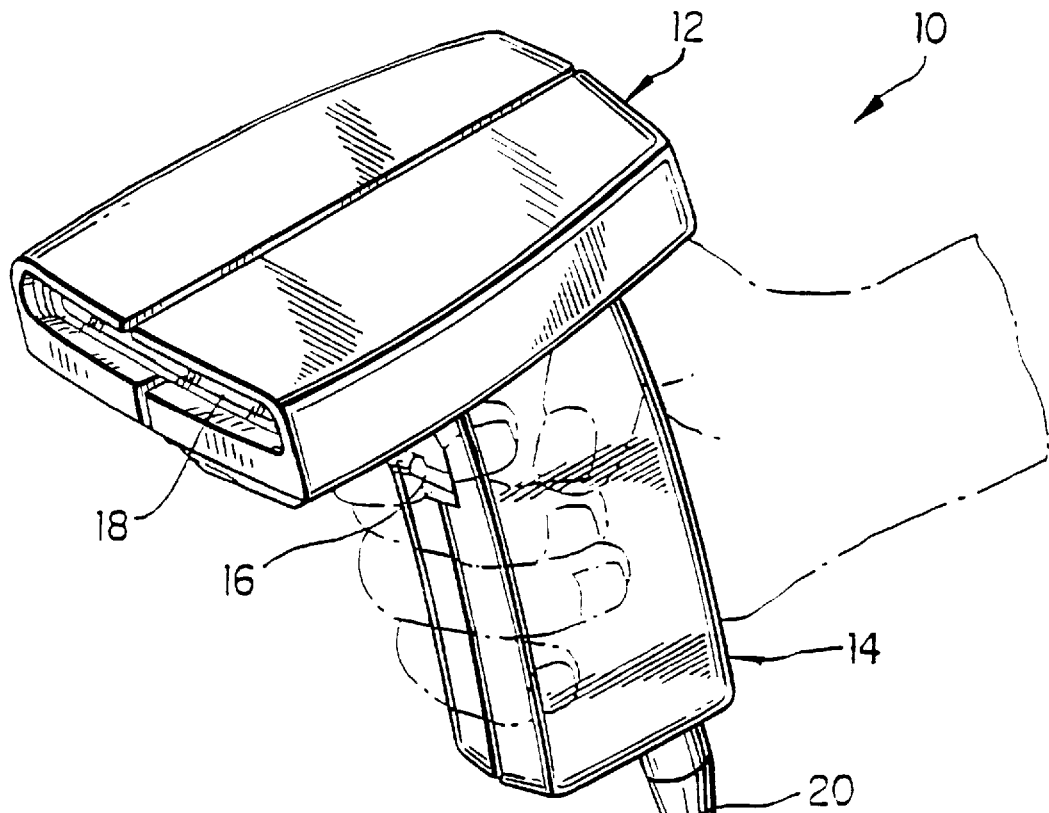
FIG. 1
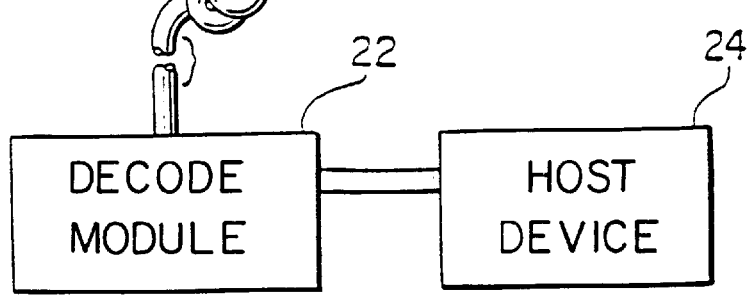

ELECTRO-MAGNETICALLY ACTIVATED SCANNER WITH SUSPENDED SCANNER COMPONENT

CROSS-REFERENCE TO RELATED APPLICATIONS

This application is a continuation of U.S. Ser. No. 08/885,513, filed Jun. 30, 1997, now U.S. Pat. No. 5,825,013, which is a continuation of U.S. Ser. No. 08/589,761, filed Jan. 22, 1996, now abandoned, which is a division of U.S. Ser. No. 08/467,124, filed Jun. 6, 1995, now U.S. Pat. No. 5,581,070, which is a continuation of U.S. Ser. No. 08/108,521, filed Jul. 19, 1993, now abandoned, which is a division of U.S. Ser. No. 07/868,401, filed Apr. 14, 1992, now U.S. Pat. No. 5,280,165, which is a division of U.S. Ser. No. 07/520,464, filed May 8, 1990, now U.S. Pat. No. 5,168,149, which is a continuation-in-part of U.S. Ser. No. 428,770, filed Oct. 30, 1989, now U.S. Pat. No. 5,099,110. This application is also related to pending U.S. Ser. No. 08/474,415, filed Jun. 7, 1995, which is a continuation of U.S. Ser. No. 08/108,521, filed Jul. 19, 1993, which is a division of U.S. Ser. No. 07/868,401, filed Apr. 14, 1992, now U.S. Pat. No. 5,280,165, which is a division of U.S. Ser. No. 07/520,464, filed May 8, 1990, now U.S. Pat. No. 5,168,149, which is a continuation in part of U.S. Ser. No. 07/428,770, filed Oct. 30, 1989, now U.S. Pat. No. 5,099,110.

BACKGROUND OF THE INVENTION

1. Field of the Invention

This invention generally relates to a scanning arrangement in a scanner operative for repetitively scanning indicia having parts of different light reflectivity, for example, bar code symbols, and, more particularly, to operating such a scanning arrangement at high speeds in single or multi-axis scan patterns.

2. Description of the Related Art

Various optical readers and optical scanners have been developed heretofore to optically read bar code symbols applied to objects in order to identify the object by optically reading the symbol thereon. The bar code symbol itself is a coded pattern comprised of a series of bars of various widths and spaced apart from one another to bound spaces of various widths, the bars and spaces having different light reflecting properties. The readers and scanners electro-optically decoded the coded patterns to multiple digit representations descriptive of the objects. Scanners of this general type have been disclosed, for example, in U.S. Pat. Nos. 4,251,798; 4,360,798; 4,369,361; 4,387,297; 4,593,186; 4,496,831; 4,409,470; 4,808,804; 4,816,661; 4,816,660; and 4,871,904, all of said patents having been assigned to the same assignee as the instant invention and being hereby incorporated herein by reference.

As disclosed in the above-identified patents and applications, a particularly advantageous embodiment of such a scanner resided, inter alia, in emitting a light beam, preferably a laser beam, emitted from a light secure, preferably a gas laser or a laser diode, and in directing the laser beam to a symbol to be read. En route to the symbol, the laser beam was directed to, and reflected off, a light reflector of a scanner component. The scanning component moved the reflector in a cyclical fashion and caused the laser beam to repetitively scan the symbol. The symbol reflected the laser beam incident thereon. A portion of the incident light reflected off the symbol was collected and detected by a detector component, e.g. a photodiode, of the scanner. The photodiode had a field of view, and the detected light over the field of view was decoded by electrical decode circuitry into data descriptive of the symbol for subsequent processing. The cyclically movable reflector swept the laser beam across the symbol and/or swept the field of view during scanning.

U.S. Pat. Nos. 4,387,297 and 4,496,831 disclose a high speed scanning component including an electric motor operative for reciprocatingly oscillating a reflector in opposite circumferential directions relative to an output shaft of the motor. Electrical power is continuously applied to the motor during scanning. The light beam which impinges on the light reflector is rapidly swept across a symbol to be scanned in a predetermined cyclical manner. The scanning component comprises at least one scan means for sweeping the symbol along a predetermined direction (X-axis) lengthwise thereof. The scanning component may also comprise another scan means for sweeping the symbol along a transverse direction (Y-axis) which is substantially orthogonal to the predetermined direction, to thereby generate a raster-type scan pattern over the symbol. In addition to a single scan line and the raster-type pattern, other types of scan patterns are also possible, such as, x-shaped, Lissajous, curvilinear (see U.S. Pat. No. 4,871,904), etc. For example, if the X and Y axis scanning motors are both driven such that the light reflectors are driven at a sinusoidally-varying rate of speed, then the scan pattern at the reference plane will be a Lissajous-type pattern for omni-directional scanning of the symbols. The use of two separate scanning motors and control means to produce the multi-axis and omni-directional scanning pattern increases material and labor costs as well as the amount of electrical power needed to operate the scanner. In addition, the relatively complicated motor shaft and bearing arrangements of the scanning components may result in a useful life that is inadequate for some applications. Furthermore, the scanning components disclosed in U.S. Pat. Nos. 4,387,297 and 4,496,831 are designed for miniature light reflectors and are not well suited for large scale reflectors.

SUMMARY OF THE INVENTION

1. Objects of the Invention

It is a general object of this invention to advance the state of the art of scanners for reading indicia of different light reflectivity, particularly laser scanners for reading bar code symbols.

An additional object of this invention is to provide novel high-speed scanning elements and novel scanning methods of operation.

Yet another object of this invention is to conveniently generate single line, multi-line or omni-directional scan patterns with the same scanning elements.

A further object of this invention is to provide a scanning arrangement having an increased scan line amplitude.

It is another object of this invention to minimize the number of elements comprising the scanning component.

Another object of this invention is to increase the working lifetime of the scanning components.

2. Features of the Invention

In keeping with these objects, and others which will become apparent hereinafter, this invention resides, briefly stated, in an arrangement for, and a method of, scanning indicia having parts of different light reflectivity by directing light toward the indicia and by collecting reflected light returning from the indicia. This invention comprises a scanner component supported by holder means for angular oscillating movement in a single scan direction between a pair of scan end positions or alternatively, in first and second scan directions between first and second pairs of scan end positions. According to this invention, read-start means are provided for moving the component between the scan end positions.

In one embodiment, the holder means is a planar leaf spring having opposite ends anchored and the scanner component mounted on a bent central portion of the spring. The read start means is comprised of a permanent magnet mounted to the holder and an electromagnetic coil for displacing the magnet in response to a driving signal. By energizing the nearby coil, the magnet and, in turn, the scanner component are oscillating, preferably at the resonant frequency of the component/magnet assembly.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a front perspective view of hand-held head employed in a scanner; and

DETAILED DESCRIPTION OF THE PREFERRED EMBODIMENTS

Figure 2:
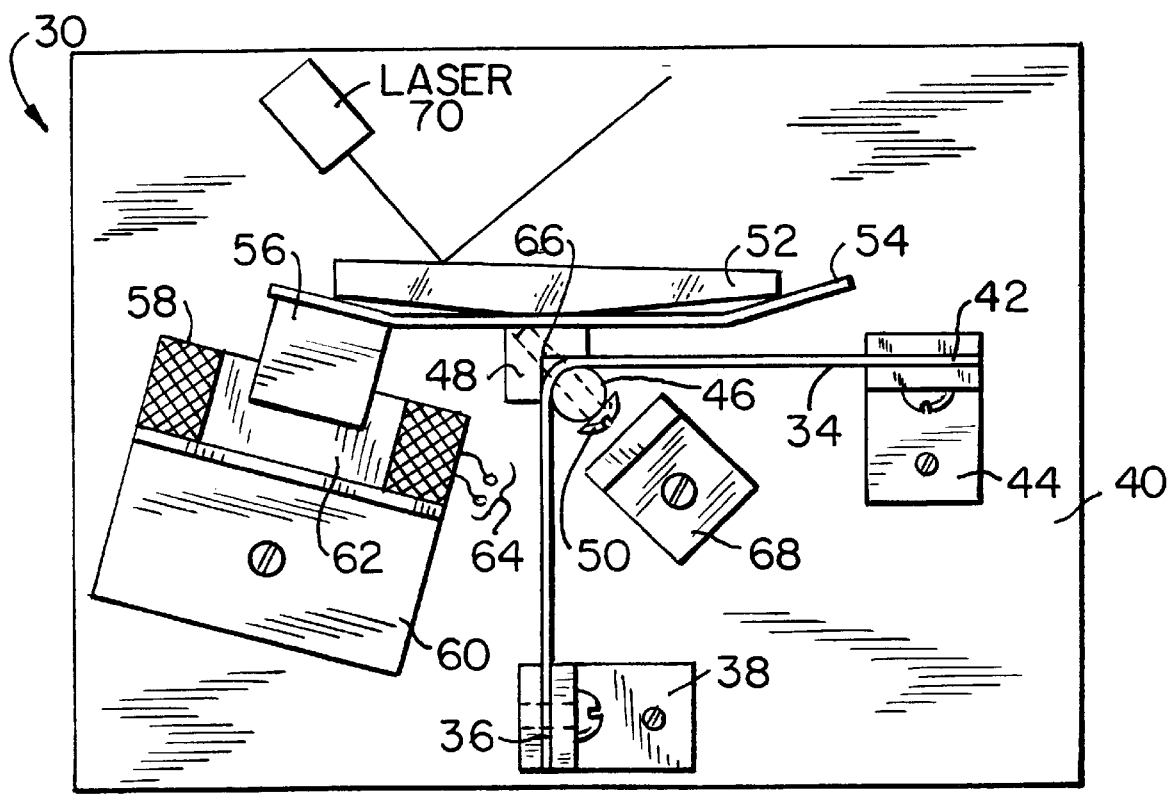
FIG. 2 is a top plan view of a further embodiment of a scanning arrangement according to this invention.

Referring now to the drawings, as shown in FIG. 1, reference numeral 10 generally identifies a hand-held, gun-shaped scanner head having a barrel 12 and a handle 14. The head need not be gun-shaped as any suitable configuration may be used, such as box-like. A manually-operable trigger 16 is situated below the barrel 12 on an upper, forwardly-facing part of the handle 14. As known from the above-identified patents and applications incorporated by reference herein, a light source component, typically, but not necessarily, a laser, is mounted inside the head 10. The light source emits a light beam along a transmission path which extends outwardly through a window 18 that faces indicia, e.g. bar code symbols, to be read. Also mounted within the head is a photodetector component, e.g. a photodiode, having a field of view, and operative for collecting reflected light returning through the window 14 along a return path from the symbol.

A scanner component is mounted within the head 10, and is operative for scanning the symbol and/or the field of view of the photodetector. The scanner component includes at least one light reflector positioned in the transmission path and/or the return path. The reflector is driven by an electrically-operated drive to oscillate in alternate circumferential directions, preferably at the resonant frequency of the scanner component.

The photodetector generates an electrical analog signal indicative of the variable intensity of the reflected light. This analog signal is converted into a digital signal by an analog-to-digital converter circuit. This digital signal is conducted, according to one embodiment, along an electrical cable 20 to a decode module 22 located exteriorly of the head 10. The decode module 22 decodes the digital signal into data descriptive of the symbol. An external host device 34, usually a computer, serves mainly as a data storage in which the data generated by the decode module 33 is stored for subsequent processing.

In operation, each time a user wishes to have a symbol read, the user aims the head at the symbol and pulls the trigger 16 to initiate reading of the symbol. The trigger 16 is an electrical switch that actuates the drive means. The symbol is repetitively scanned a plurality of times per second, e.g. 40 times per second. As soon as the symbol has been successfully decoded and read, the scanning action is automatically terminated, thereby enabling the scanner so be directed to the next symbol to be read in its respective turn.

In addition, the head need not be a portable hand held type is fixedly mounted heads are also contemplated in this invention. Furthermore, the heads may have manually operated triggers or may be continuously operated by direct connection to an electrical source.

The oscillations need only last a second or so, since the multiple oscillations, rather than time, increase the probability of getting a successful decode for a symbol, even a poorly printed one. The resonating reflector has a predetermined, predictable, known, generally uniform, angular speed for increased system reliability.

As shown, in FIG. 2, one embodiment 30 of a high speed scanning arrangement of the present invention, includes a flexible beam, e.g. a generally planar leaf spring 34. Leaf spring 34 has one end 36 fixedly mounted to an upright of an L-shaped bracket 38 which is anchored to a base support 40. Spring 34 has an opposite end 42 fixedly mounted to an upright of another L-shaped bracket 44 which is anchored to the base support 40. The uprights are oriented at 90° relative to each other. A central portion of the spring 34 is guided around a cylindrical clamping pin 46. The central portion of the spring 34 is clamped between the clamping pin 46 and a bearing surface of a V-block 48 by means of a set screw 50. The clamping pin 46 imparts a 90° bend to the leaf spring at the central portion.

A scanner component, e.g. a light reflector 52, is fixedly mounted to a rear support 54 which, in turn, is fixedly secured to the V-block. The rear support 54 has a permanent magnet 56 mounted at one of its ends. An electromagnetic coil 58 is mounted adjacent the magnet 56 on an upright of another L-shaped bracket 60 which, in turn, is mounted on the base support 40. The coil 58 has a central passage 62 through which the magnet enters with clearance each time a momentary, periodic energizing pulse is applied to input leads 64. The frequency of the energizing pulse is preferably selected at the resonant frequency of $$\frac{1}{2\pi}\sqrt{\frac{k}{I}},$$

where k equals the spring constant of leaf spring 34, and where I equals the moment of inertia of the magnet/reflector assembly suspended from the leaf spring. The assembly is oscillated about the axis 66. The spring is advantageously constituted of plastic or metal material. Non-metal materials would be more rugged.

In operation, each time the energizing pulse is applied to the coil 58, the magnet 56 is drawn into the passage 62, thereby pulling the reflector 52, the rear support 54, the V-block 48, the clamping pin 46, the set screw 50 thereal-ong. At the same time, the leaf spring is bent. In the illustrated rest position, each arm of the leaf spring is generally planar. Upon being displaced, each arm of the leaf spring is bent, thereby storing energy therein. An L-shaped step 68 mounted on the base support 40 is located behind the clamping pin 46 to prevent movement of the same pass the step. The pin 46 does not normally engage the step; it is intended as a safety feature in the event that the arrangement is subjected to external shock forces. The flexible support near the center of rotation of the component provides an excellent shock absorber.

Once bent, the leaf spring 20 releases its stored energy, thereby displacing the magnet/reflector assembly back to and past the rest position. The entire assembly oscillates in a damped manner, until eventually coming to a halo in the rest position. Each arm of the leaf spring alternately assumes a concave and then a convex shape during such oscillation. Light directed from a source, e.g. a laser 70, onto the reflector 52 is swept in one direction in a scan across indicia to be read. Another embodiment of the same configuration utilizes constant amplitude excitation, with continuous oscillation. In this embodiment, the driving signal is a continuously applied AC signal that causes the magnet 56 to by cyclically drawn into the passage 62 and formed out of the passage 62. The spring 34 vibrates to oscillate the reflector 40 between scan end position.

By providing a well defined center of rotation at axis 66 that is close to the scan component, image translation is minimized. In addition, in this configuration the scan pattern stays centered regardless of the scan position.

It will be understood that each of the elements described above, or two or more together, also may find a useful application in other types of constructions differing from the types described above.

While the invention has been illustrated and described as embodied in a power-saving scanning arrangement, it is not intended to be limited to the details shown, since various modifications and structural changes may be made without departing in any way from the spirit of the present invention.

Without further analysis, the foregoing will so fully reveal the gist of the present invention that others can be applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A scanner for reading bar code symbols by directing light toward a symbol, and by collecting reflected light returning from the symbol, said scanner comprising:
   a) a scanner assembly;
   b) a holder for mounting the scanner assembly, said holder including a support frame and a spring for attaching the scanner assembly to the support frame so that the scanner assembly oscillates by reciprocating about an axis with respect to the support frame in alternate circumferential directions thereof between two scan end positions;
   c) a drive operative for moving the scanner assembly in at least one of the circumferential directions from a rest position in the direction of one of the two scan end positions whereby, during such movement to said one scan end position, the spring is tensioned and stores energy and, upon the scanner assembly reaching said one scan end position, the stored energy in the spring is released, thereby to return the scanner assembly in the other of the circumferential directions to the other one of the scan end position; and
   d) said scanner assembly being repeatedly oscillated between the two scan end positions by a periodic, energizing pulse to the drive so that, in response to the energizing pulse, the scanner assembly is moved in a first circumferential direction to said one scan end position, and then the scanner assembly is returned in the other circumferential direction solely by the spring back to and past the rest position located between the scan end positions, and said scanner assembly thereafter continuing oscillation in a damped manner from energy stored in the spring until the next energizing pulse is applied.

2. The scanner according to claim 1, wherein the energizing pulse has a frequency equal to the resonant frequency of the spring.

3. The scanner according to claim 2, wherein the energizing pulse is applied approximately at the time the scanner assembly moves past the rest position in the first circumferential direction as the scanner assembly is returned by the energy stored in the spring.

4. The scanner according to claim 1, and further comprising a semiconductor laser diode for generating a laser light beam.

5. The scanner according to claim 1, wherein the spring is a single, unitary, flexural component having one portion forming a first flexure and a second portion forming a second flexure.

6. The scanner according to claim 5, wherein the spring further includes an arcuate connecting portion that connects the first flexure and the second flexure and extends along an arc of 90°.

7. The scanner according to claim 5, wherein the flexures are constituted of a flexible, resilient material.

8. The scanner according to claim 5, wherein the flexures are constituted of a metallic material.

9. The scanner according to claim 5, wherein the flexures are constituted of a plastic material.

10. The scanner according to claim 5, wherein each flexure is a leaf spring.

11. The scanner according to claim 5, wherein the first and second flexures lay in first and second respective planes intersecting at an axis, said spring supportably mounted the scanner assembly for oscillating movement generally about said axis, said first flexure being operatively connected to a support and the scanner assembly, said second flexure being operatively connected to the support and the scanner assembly.

12. The scanner according to claim 11, wherein said first and second flexures are elongated and have first and second upper longitudinal edges respectively, each upper edge extending lengthwise of the respective first and second flexures, said first and second upper longitudinal edges lying in a common plane generally perpendicular to said axis.

13. The scanning according to claim 11, wherein said first and second flexures are elongated and have first and second lower longitudinal edges respectively, each lower edge extending lengthwise of the respective first and second flexures, said first and second lower longitudinal edges lying in a common plane generally perpendicular to said axis.

14. The scanner according to claim 11, wherein the first plane in which the first flexure lies is orthogonal to the second plane of the second flexure.

15. The scanner according to claim 11, wherein the drive includes an energizable electromagnetic drive coil member and a drive magnet member, and wherein one of said drive members in mounted on the support, and wherein the other of said drive members is operatively connected to the scanner assembly.

16. The scanner according to claim 15, wherein said one drive member is the electromagnetic coil member having a passage, and wherein said other drive member is the magnet member movable generally in the direction of the passage during energization of the coil.

17. The scanner according to claim 16, wherein the energizing pulse is applied approximately at the time the magnet member enters the passage.

18. The scanner according to claim 15, wherein the scanner assembly includes a scan component and an elongated supporting component for support the scan component and wherein the coil and magnet members are located at an end region of the elongated supporting component.

19. The scanner according to claim 1, wherein the scanner assembly includes a light reflector.

20. The scanner according to claim 1, wherein the scanner assembly includes an optical component for directing the laser light beam.

21. The scanner according to claim 20, wherein the optical component is a mirror.

22. The scanner according to claim 1, wherein the energizing pulse is a periodically occuring momentary pulse.

23. The scanner according to claim 1, wherein the energizing pulse is an alternating current waveform.

24. The scanner according to claim 1, wherein the energizing pulse is a constant amplitude waveform.

25. A method of reading bar code symbols by directing light toward a symbol and by collecting reflected light returning from the symbol, said method comprising the steps of:

a) mounting a scanner assembly of a holder, and attaching the scanner assembly to a support frame with a spring so that the scanner assembly is oscillatable by reciprocating about an axis with respect to the support frame in alternate circumferential directions thereof between two scan end positions;

b) operating a drive for moving the scanner assembly in at least one of the circumferential directions from a rest position in the direction of one of the two scan end positions whereby, during such movement to said one scan end position, the spring is tensioned and stores energy and, upon the scanner assembly reaching said one scan end position, the stored energy in the spring is released, thereby to return the scanner assembly in the other of the circumferential directions to the other one of the scan end position; and c) repeatedly oscillating the scanner assembly between the two scan end positions by a periodic momentary, energizing pulse to the drive so that, in response to the momentary pulse, the scanner assembly is moved in a first circumferential direction, to said one scan end position, and then the scanner assembly is returned in the other circumferential direction solely by the spring back to and past the rest position located between the scan end positions, and said scanner assembly thereafter continuing oscillation in a damped manner from energy stored in the spring until the next momentary periodic pulse is applied.

26. The method according to claim 25, further comprising the step of selecting the energizing pulse to have a frequency equal to the resonant frequency of the spring.

27. The method according to claim 25, further comprising the step of applying the energizing pulse approximately at the time the scanner assembly moves past the rest position in the first circumferential direction as the scanner assembly is returned by the energy stored in the spring.

28. The method according to claim 25, wherein the drive includes an energizable electromagnetic drive coil member and a drive magnet member, and wherein one of said drive members in mounted on the support frame, and wherein the other of said drive members is operatively connected to the scanner assembly.

29. The method according to claim 28, wherein said one drive member is the electromagnetic coil member having a passage, and wherein said other drive member is the magnet member movable generally in the direction of the passage during energization of the coil.

30. The method according to claim 29, further comprising the step of applying the energizing pulse approximately at the time the magnet member enters the passage.

31. The method according to claim 25, wherein the energizing pulse is a periodically occuring momentary pulse.

32. The method according to claim 25, wherein the energizing pulse is an alternating current waveform.

33. The method according to claim 25, wherein the energizing pulse is a constant amplitude excitation.

* * * * *